Figure 1:
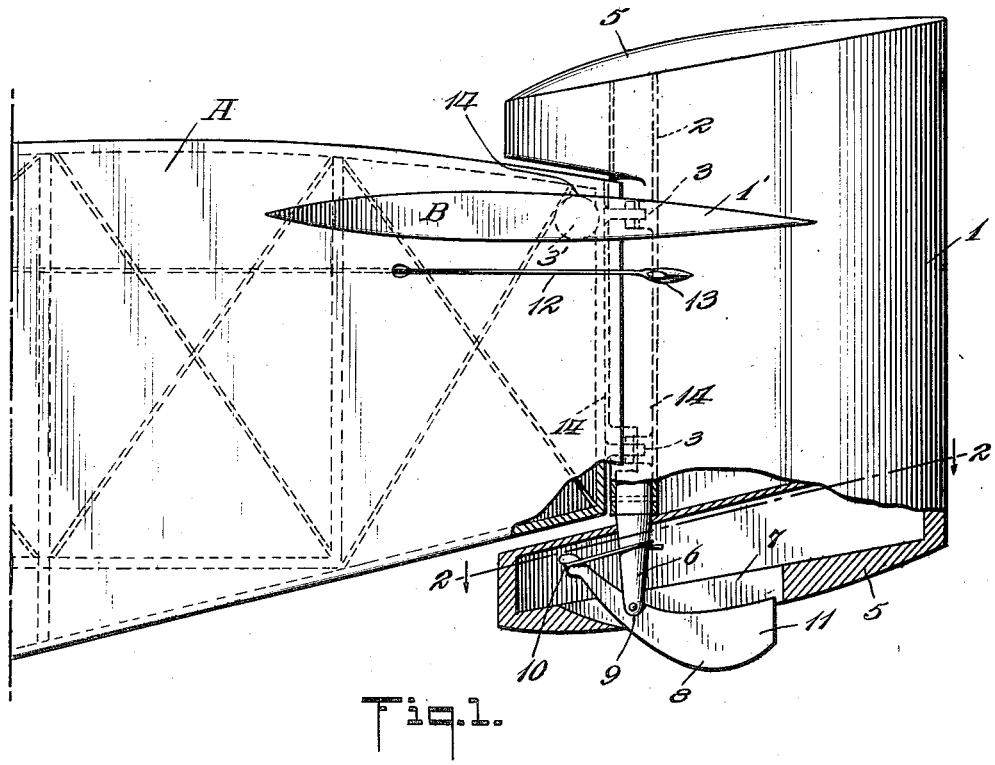

April 29, 1924.

J. V. MARTIN 1,492,518

AEROFOIL END FORM

Original Filed April 18, 1918

INVENTOR
James V. Martin

Patented Apr. 29, 1924.

1,492,518

UNITED STATES PATENT OFFICE.

JAMES V. MARTIN, OF GARDEN CITY, NEW YORK.

AEROFOIL END FORM.

Original application filed April 18, 1918, Serial No. 229,664. Divided and this application filed January 8, 1923. Serial No. 611,311.

*To all whom it may concern:*

Be it known that I, JAMES V. MARTIN, a citizen of the United States, residing at Garden City, in the county of Nassau and the State of New York, have invented a new and useful Aerofoil End Form, of which the following is a specification.

This invention relates to improvements in aircraft construction and more particularly to the novel construction of the aerofoil, exemplified herein as a rudder, whereby the wind resistance is reduced and the construction simplified.

This is a division of my copending application for shock absorbing rudder, Serial No. 229,664, and relates especially to those features of the original application which have been regarded by the Patent Office as distinct inventions.

A further object of my invention is to reduce the air turbulence caused by the presently employed gap between aeroplane controls and the parts to which they are hinged; the invention consists in the combination, construction and arrangement of parts herein set forth and more particularly pointed out in the appended claims.

Heretofore it has been customary to taper down the camber of the aerofoil near the end and to round the end in plan form: In the drawing, which is merely illustrative of the invention, a simple and efficient aerofoil cap or end form is shown which greatly reduces the air turbulence around the aerofoil ends and is of such simple construction that it may be made up separately as a unit and attached to the aerofoil after the aerofoil framework is otherwise completed.

As shown in the drawing, A indicates the tail end of the fuselage of an aeroplane and B indicates the usual horizontal tail plane or altitude rudder, which has end forms such as that indicated by 5 on rudder 1. On the extreme end or rear strut of the fuselage a rudder 1 is hinged on rudder post 2 by fuselage pivot supports 3. The rudder 1 is of streamline contour, as shown in cross-section in Fig. 2, with thin side walls 4 of double convex form, and top and bottom walls 5 having convex outer surfaces; the usual ribs, one of which can be seen in Fig. 1 where the aerofoil surface is broken away, hold the aerofoil form of the rudder while the rudder post functions in place of the usual wing spar of an aerofoil; thus providing a hollow structure which is very light yet affords great strength. The leading edge of the rudder aerofoil is notched so that the top and bottom portions thereof overlap the rear end of the fuselage forming balanced portions and the rudder post is located approximately one third the rudder cord length from the leading edge. 6 indicates the lower extremity of the rudder post, 7 a slot or opening in the rudder bottom for the accommodation of a skid 8 pivoted at 9 and provided with rubber shock absorber at 10; 11 is a streamline attached to skid 8. The rudder is controlled from the pilot's position by means of the usual control wires 12 to arms 13, while the horizontal rudder flap 1' is controlled by the torque tube 3' indicated by dotted circle and operated by means concealed within the fuselage cover. The forward portion of the horizontal rudder is rigid with the fuselage structure according to usual practice and has end forms corresponding to the top aerofoil form of the rudder.

An aerofoil is any shape projected through the air for an aerodynamic reaction, and there are generally three sorts or kinds of aerofoils employed upon an aeroplane, propelling, maintaining and controlling. I have chosen to illustrate my invention as employed upon two of the aeroplane controls, i. e. the directional or rudder control and the longitudinal or horizontal rudder control, but as shown in my other applications for patent, Serials 254,233 and 294,466 and 204,602, the same double convex aerofoil type can be employed to advantage for lateral or aileron control and for the main wing and also for the propeller blade.

Figure 2:
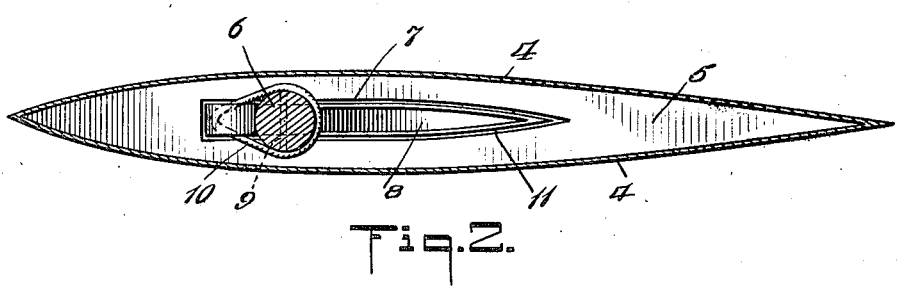

As shown in Fig. 1, I have eliminated the crack which in practice has heretofore created air turbulence between the aeroplane controls such as ailerons and rudders and the rigid aeroplane parts such as wings and fuselage to which these controls are usually attached; for this purpose I have made the outer skin of the control surface continuous with the rigid portion of the aeroplane to which it is hinged, as illustrated at 14 of horizontal rudder B in Fig. 1, and to permit free movement of the control I employ elastic material like dentist's rubber to bridge the gap from the fabric of the control as shown by dotted lines 14 of rudder 1 to the fabric of rigid portion shown as fuselage A.

Where fabric is displaced by metal covering sheet aluminum may be substituted for the rubber, in which case only the forward edge of the aluminum sheet would be attached to the aeroplane and the rear edge allowed to slide over the surface of the control as it moves about its axis.

My wind tunnel experiments upon aerofoils have indicated that gaps or breaks in an aerofoil surface seriously interfere with the efficiency of the aerofoil and therefore I have shown means of closing the gaps where aerofoils used as controls are hinged and I have also shown an improved form of aerofoil end which simplifies construction and greatly reduces the drag of the aerofoil.

Having thus described my invention what I claim is:

1. A double convex aerofoil of uniform camber throughout its span and provided with an end form of approximately half round cross section, said cross section having a radius approximately equal to one half the aerofoil camber at each point along the cord.

2. In combination with an aircraft an aerofoil provided with an aerofoil end form of substantially parabolic shape along a considerable portion of its fore and aft contour and a substantially half round form in cross section.

3. An aerofoil end form comprising a substantially straight portion in contact with the said aerofoil and a round transverse section tapering in size from a small section at the leading and trailing edges to a maximum at approximately one third the aerofoil cord length from the leading edge.

4. In an aircraft, an aerofoil end form of substantially half round shape in sections transverse to the line of flight and said sections gradually increasing in radius from a minimum at the aerofoil leading and trailing edges to a maximum at approximately one third the aerofoil cord length from its leading edge.

5. In combination with the rigid portion of an aircraft, an aircraft controlling aerofoil hinged thereto, said aerofoil having an end form increasing in size of transverse section to a maximum at one third distance from its forward part and forming a substantially continuous streamline with the external surface of said rigid portion.

6. In combination with an aeroplane fuselage an aircraft rudder control comprising a double convex form of aerofoil internally braced and journalled to turn about an axis located at its approximate greatest camber, said rudder forming a complementary part of the rear streamline of the said fuselage.

7. In combination with an aeroplane fuselage having a relatively blunt stern portion provided with a wholly internally braced horizontal aerofoil, a rudder fitted to rearward of said blunt portion, journalled thereto and forming a streamline therefor.

8. In an aeroplane, aerofoils converging forwardly at their ends and said ends provided with end forms having half round cross sections.

9. The combination with an aeroplane fuselage having a comparatively blunt rear end, a rudder having a relatively thick portion journalled to said rear end and forming a substantial streamline continuation of the external surface of the said fuselage.

10. In combination with the rear portion of an aeroplane fuselage, a double convex horizontal aerofoil with its forward portion rigidly secured to said fuselage and its rear portion journalled to said forward portion, and a rudder aerofoil approximately at right angles to the first said aerofoil and said rudder aerofoil complementing the rear streamline of the said fuselage.

11. An aerofoil for aeroplanes having a comparatively sharp leading edge, portions of the aerofoil surface lying on both sides of a straight line from said aerofoil's leading and trailing edges and an end form of said aerofoil comparatively blunt in sections transverse to the line of flight, but curved in a fore and aft direction.

JAMES V. MARTIN.